United States Patent
Ronaldson et al.

(10) Patent No.: US 7,564,041 B2
(45) Date of Patent: Jul. 21, 2009

(54) METHOD OF USING SELF-POSITIONING RADIATION COUNTERS

(75) Inventors: John Paul Ronaldson, Cumbria (GB); John Adrian Lightfoot, Cumbria (GB)

(73) Assignee: Bil Solutions Limited, Seascale, Cumbria (GB)

( * ) Notice: Subject to any disclaimer, the term of this patent is extended or adjusted under 35 U.S.C. 154(b) by 0 days.

(21) Appl. No.: 11/396,090

(22) Filed: Mar. 31, 2006

(65) Prior Publication Data

US 2006/0249684 A1 Nov. 9, 2006

(30) Foreign Application Priority Data

Mar. 31, 2005 (GB) ................. 0506602.2

(51) Int. Cl.
*G01J 1/42* (2006.01)
(52) U.S. Cl. ............... 250/395; 250/390.01; 376/153; 702/27
(58) Field of Classification Search ............... 250/395, 250/390.01; 376/153; 702/27
See application file for complete search history.

(56) References Cited

U.S. PATENT DOCUMENTS

| 4,620,100 | A | | 10/1986 | Schoenig, Jr. et al. |
| 5,378,895 | A | | 1/1995 | Cole et al. |
| 5,423,683 | A | | 6/1995 | Hurst et al. |
| 5,446,288 | A | * | 8/1995 | Tumer ............ 250/390.05 |
| 5,936,240 | A | * | 8/1999 | Dudar et al. ............ 250/253 |
| 6,528,797 | B1 | * | 3/2003 | Benke et al. ............ 250/393 |
| 6,912,485 | B2 | * | 6/2005 | Lightfoot et al. ............ 702/188 |
| 7,043,411 | B1 | * | 5/2006 | Ronaldson et al. ............ 703/6 |
| 2005/0135534 | A1 | * | 6/2005 | Jones et al. ............ 376/153 |

FOREIGN PATENT DOCUMENTS

| EP | 0 193 937 B1 | 7/1972 |
| WO | WO 98/53341 | 11/1998 |
| WO | WO 9853341 A1 * | 11/1998 |

OTHER PUBLICATIONS

"subsequent." Collins English Dictionary. 2000. Xreferplus. Feb. 7, 2007 <http://www.xreferplus.com/entry/2698316>.*
S. Buck et al., *Plutonium Inventory Measurements During Decommissioning Operations*, Waste Management Conference in Tucson, Arizona, 1990, pp. 797-805.

* cited by examiner

*Primary Examiner*—David P Porta
*Assistant Examiner*—Jessica L Eley
(74) *Attorney, Agent, or Firm*—Workman Nydegger

(57) ABSTRACT

A method of collecting data on radioactive material includes: positioning a detector unit at a first position relative to the environment; collecting at least a part of a first set of data from a first position using a detector unit; and collecting at least a part of one or more subsequent sets of data on the environment from one or more subsequent positions using the detector unit; wherein one or more of the subsequent positions is determined, at least in part, by considering at least a part of the data of one or more of the sets of data previously collected. The subsequent positions are determined so as to improve the information on the radioactive material provided as a result of the data collected from that position.

32 Claims, 2 Drawing Sheets

METHOD OF USING SELF-POSITIONING RADIATION COUNTERS

CROSS-REFERENCE TO RELATED APPLICATIONS

This application claims priority to United Kingdom Patent Application No. GB 0506602.2, filed Mar. 31, 2005, the disclosure of which is incorporated herein by reference.

BACKGROUND OF THE INVENTION

1. The Field of the Invention

This invention provides improvements in and relating to data collection, particularly, but not exclusively through sequential data collection.

2. The Relevant Technology

In the context of radiometric measurements and other measurements of an environment, the usual practice is to provide sufficient detectors to collect all the data needed in a single operation and through a single deployment of the detectors. Standard arrangements and deployments of detectors arise for such purposes.

SUMMARY OF THE INVENTION

The present invention has amongst its potential aims to provide more flexible data collection.

According to a first aspect we provide a method of collecting data on radioactive material within an environment, the method comprising:

selecting an environment;

positioning a detector unit at a first position relative to the environment;

collecting at least a part of a first set of data on the environment;

positioning the detector unit at one or more subsequent positions relative to the environment;

collecting at least a part of a set of data on the environment for each subsequent position;

wherein one or more of the subsequent positions is determined, at least in part, by considering at least a part of the data of one or more of the set of data previously collected.

According to a second aspect we provide a method of collecting data on radioactive material, the method comprising:

positioning a detector unit at a first position relative to the environment;

collecting at least a part of a first set of data from a first position using a detector unit;

collecting at least a part of one or more subsequent sets of data on the environment from one or more subsequent positions using the detector unit;

wherein one or more of the subsequent positions is determined, at least in part, by considering at least a part of the data of one or more of the sets of data previously collected.

The aspects of the invention may include features, options or possibilities from amongst the following.

The radioactive material may be an alpha and/or beta and/or gamma and/or X-ray and/or neutron emitter. The radioactive material may be present on its own and/or as part of a matrix. The radioactive material may be on a surface and/or may be contained.

The environment may be a building or part thereof. The environment may be a room, cell, vault, silo, storage site, container, process vessel or part thereof.

The environment may be selected by selecting a part of a larger environment, for instance by selecting that part of an environment around a piece of equipment. The environment may be selected by selecting a pre-defined environment which is established as requiring data collection, for instance a room for which information is needed to enable decommissioning.

The positioning of the detector unit at a first position may be by physically moving the detector unit to the first position. The detector unit may be physically moved by a person and/or machine. The detector unit may be physically moved relative to a fixed environment and/or fixed radioactive material. The detector unit may be physically moved to a position from which radioactive material can be detected, for instance by positioning the detector unit adjacent a piece of equipment and/or within a room.

Preferably information on the first position is captured and/or known. The information on the first position may define the position relative to a known reference point. The reference point may be a part of the environment and/or a part of the item the radioactive material is within.

The detector unit may detect radioactive material directly. The detector unit may detect alpha and/or beta and/or gamma and/or X-ray emissions and/or neutrons. The detector unit may detect the radioactive material indirectly. The detector unit may detect ions.

One or more detector units may be used. Preferably a single detector unit is used. The detector unit may provide one or more detectors. A plurality, such as four or six, detectors may be provided in a detector unit, particularly when detecting neutrons. A single detector may be provided in a detector unit, particularly when detecting gamma emissions.

The collecting of the set(s) of data may involve establishing a count and/or count rate. The collecting of the set(s) of data may involve establishing a multiplicity rate, potentially at one or more levels, such as double, triple and quadruple levels. The collecting of the set(s) of data may provide separate data for each detector in a detector unit and/or for a detector unit as a whole.

A set of data may be the data collected in a given, for instance pre-determined, amount of time. A part of a set of data may be the data collected in less than the given amount of time and/or a selection of some of the data from a set of data. The collection of a set of data may be stopped part way through the collection, for instance if the part of a set of data does not meet one or more criteria. The criteria may be one or more details within the data, for instance a minimum level of counts or count rate. The criteria may be the ability to inform and/or ability to discriminate and/or ability to resolve based on the part of a set of data. Preferably a set of data is collected separately from the other sets of data, ideally at a separate time. Preferably the sets of data are collected sequentially and/or not simultaneously.

The positioning of the detector unit at one or more subsequent positions may be by physically moving the detector unit to the one or more subsequent positions. The detector unit may be physically moved by a person and/or machine. The detector unit may be physically moved relative to a fixed environment and/or fixed radioactive material. The detector unit may be physically moved to a position from which radioactive material can be detected, for instance by positioning the detector unit adjacent a piece of equipment and/or within a room.

Preferably information on the one or more subsequent positions is captured and/or known. The information on the one or more subsequent positions may define the position relative to a known reference point. The reference point may be a part of the environment and/or a part of the item the radioactive material is within. Preferably the same reference point is used for the first position and subsequent positions.

The one or more subsequent positions may differ from the first position and/or from each other, in terms of their position relative to a reference point. The positions may differ in terms of the position of the centre of the detector unit and/or the centre of a detector therein. The positions may differ from one another by at least 50 cm and more preferably by at least 1 m. The positions may differ in terms of vertical and/or horizontal directions.

The consideration to determine one or more of the subsequent positions may use one or more sets of data and/or one or more part sets of data. In particular, the consideration may use the part set of data being collected and all the previous sets of data collected. The consideration may occur whilst a set of data is being collected. The instrument collecting and considering the sets of data may determine the one or more subsequent positions, for instance by indicating to the user the one or more subsequent positions. The user may consider output from the instrument collecting and considering the sets of data. The user may determine the one or more subsequent positions, for instance based upon one or more outputs from the instrument.

The one or more subsequent positions whose positions are determined by the consideration of the previously collected sets of data may differ from a pre-suggested position. The pre-suggested position may be the next position in a pre-suggested set of positions. The pre-suggested set of positions may be established before the detector unit is provided at the first position and/or before the method commences. The pre-suggested set of positions may be a standard set of positions for a given environment type and/or size. The pre-suggested set of positions may be regular and/or stepped and/or sequential positions within the environment and/or with respect to a container containing the radioactive material. The pre-suggested set of positions may progress in sequence around the environment of a part thereof. The pre-suggested set of positions may be those positions most easily accessible.

The one or more subsequent positions whose positions are determined by the consideration of the previously collected sets of data may differ from a pre-suggested position in terms of the position compared with a, or potentially any, pre-suggested position and/or in terms of the sequence of the position compared with the next pre-suggested position.

The method may include the use of the data collected to provide information on the radioactive material. The information may be or include the position and/or activity and/or mass and/or isotopic make up of the radioactive material.

The method may provide information on the radioactive material during and/or after the collection of each set of data or part thereof. The method may provide information by rendering the provision of the information solvable given the set or sets of data or parts thereof collected, for instance by using one or more factors. The factors may be one or more assumptions and/or constraints. One or more of the one or more factors may change and/or no longer be needed for the provision of information as the number and/or completeness of one or more of the sets of data increases. One or more of the factors may be relaxed as the number and/or completeness of one or more of the sets of data increases.

One or more, preferably each, of the one or more subsequent positions determined, at least in part, by considering at least a part of the data of one or more of the sets of data previously collected may be determined so as to improve the data collected and/or the information on the radioactive material provided as a result of the data collected from that position. The position may be determined so as to increase the accuracy and/or confidence of the information on the radioactive material. The position may be determined so as to decrease the error and/or uncertainty in the information on the radioactive material. The position may be determined so as to address, potentially through increased data and/or data sets on, issues with one or more parts of the environment. The issues may be shielding and/or attenuation and/or matrix effects and/or uneven distribution of radioactive material and/or detector sensitivity and/or detector unit sensitivity.

BRIEF DESCRIPTION OF THE DRAWINGS

Various embodiments of the invention will now be described, by way of example only, and with reference to the accompanying drawings in which.

DETAILED DESCRIPTION OF THE PREFERRED EMBODIMENTS

Investigations of environments to determine the presence and/or amount and/or distribution of radioactive material in the environment are made using a number of existing instrument designs. A common approach is usually taken to such investigations, the environment is established and then the position for the instrument's detector array within it decided. The detector array is then placed in that position, potentially with other detector arrays of the same instrument being placed in their predetermined positions at the same time. The investigation is then performed and the data collected simultaneously from all the detectors. The instrument can then be removed and taken to another environment.

WO98/53341 discloses an instrument for considering the neutron emissions arising from an environment with a view to establishing the location or locations of radioactive materials within that environment. To do this the instrument considers the passive neutrons arising from the environment using arrays of detectors. Various arrays are provided, including: panels of two detectors, where four such panels are provided along each long side and two such panels are provided at each end; and including panels of six detectors in pairs, where two such panels are provided along each long side and one such panels is provided at each end.

In either case a significant number of panels are used, with the panels placed around the environment on all sides.

Data in the form of count rates is collected from all the detectors and all the panels simultaneously. This data is used in a processing stage which seeks to resolve the source locations. The determination is provided by simulated one or more sources and calculating the simulated count rates the detectors would observe as a result. These simulated count rates for individual detectors are then considered against the actual count rates and a measure of the match is obtained.

Variations in the simulated source locations and activity are made to bring the simulated and actual data sets in to as close a fit as possible. The result is one or more suggested locations within the environment for sources and a suggestion as to the activity of each source.

Such an approach is not suited to every environment where such measurements are desirable and an instrument in this form is not suited to use at a large number of different sites over a short time frame because of transportation issues.

Figure 1:
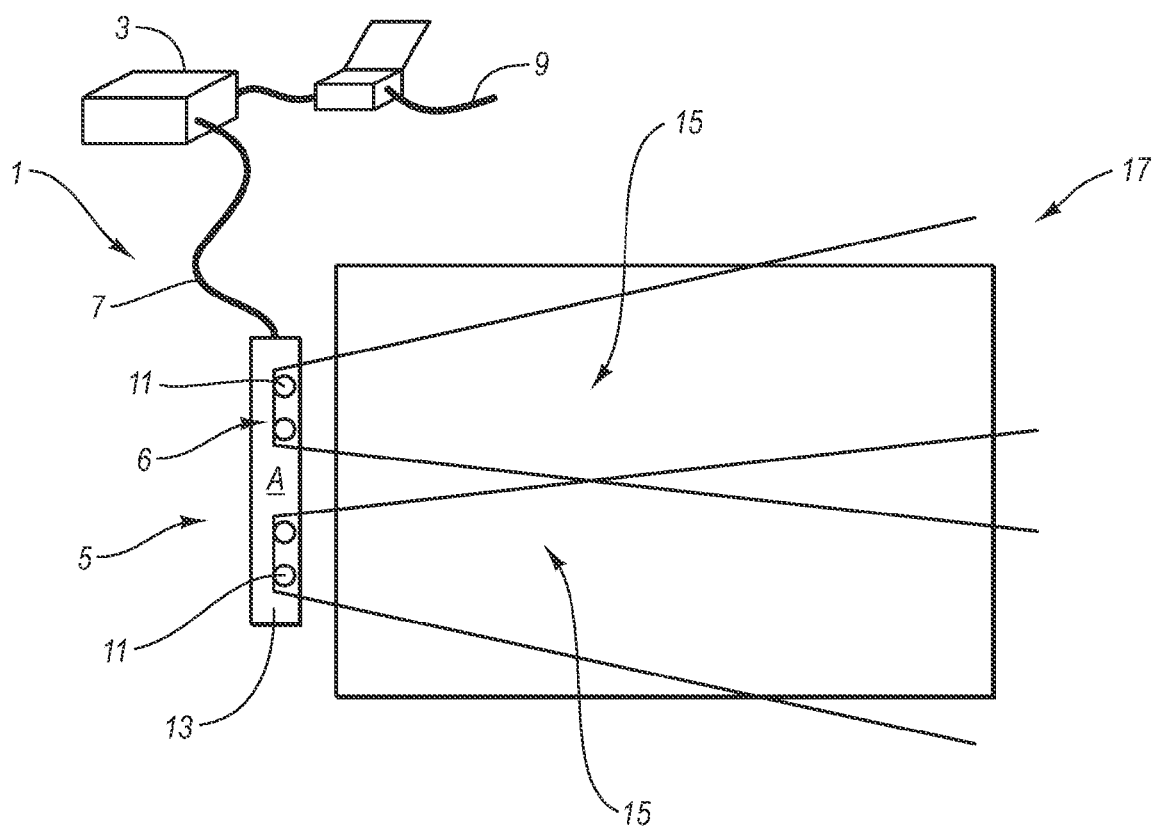
FIG. 1 is an illustration of a first embodiment of the invention for investigating an environment, with the detector array of the instrument in a first position.

In a first embodiment of the present invention, FIG. 1, the instrument 1 takes the form of a processing unit 3 and a single detector array 5 which can be connected to it by cable 7. The detector array 5 is in the form of a panel 6. The processing unit 3 provides the necessary data capture and storage facilities, together with processing capability. A user interface 9 is provided to display data and allow user inputs. The panel 6 consists of four detectors 11 provided in suitably shaped moderating material 13 to define fields of view 15 for the detectors.

When the instrument 1 is to be used to consider an environment 17, the operator establishes a series of positions A, B, C, D, E, F, around the environment 17 which are intended for use in investigating it. The instrument is then set up with the panel 6 provided at the first position A. The environment 17 is then measured for a time period to generate a first data set. The first data set collected is stored for future use.

Figure 2:
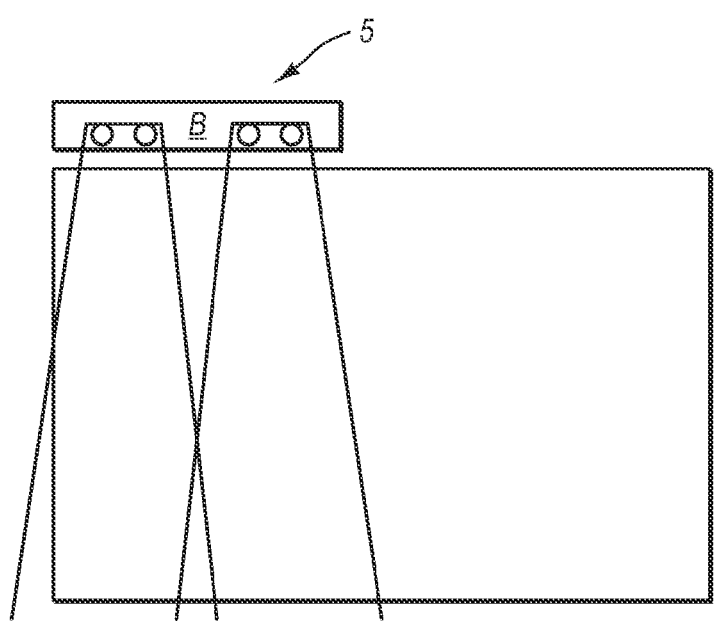
FIG. 2 is an illustration of the invention of FIG. 1 with the detector array in a second position.

The first data set may suggest the presence of sources within environment, but the count rates for each detector 11 may be so similar as not to suggest any particular location. If the first data set on its own is not particularly informative, the user chooses to proceed with the next measurement at the second position B, as shown in FIG. 2.

Figure 3:
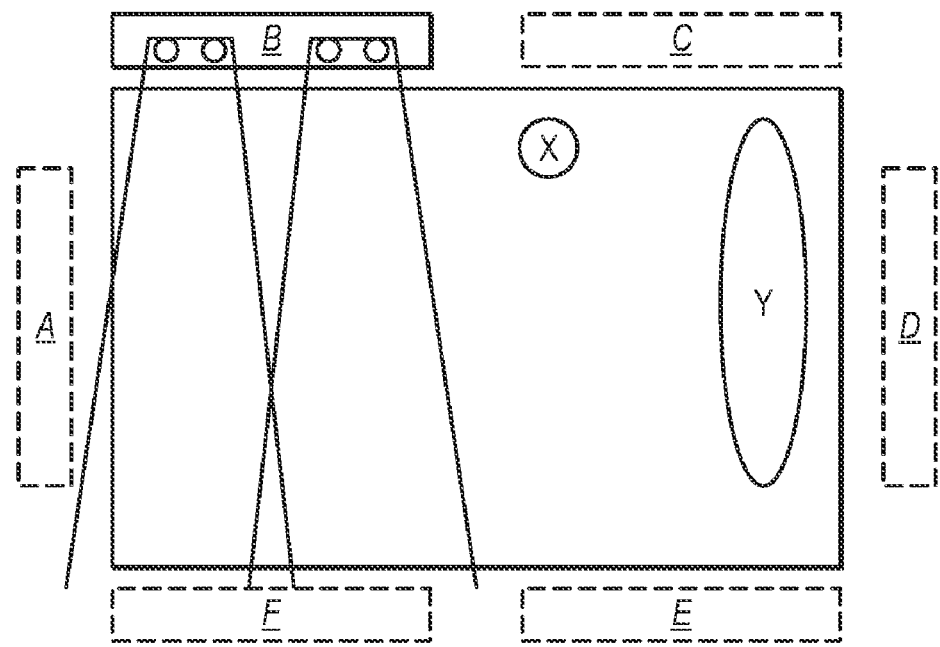
FIG. 3 is an illustration of two possible solutions to the source positions with the environment arising from the data sets from the first and second position.
Figure 4:
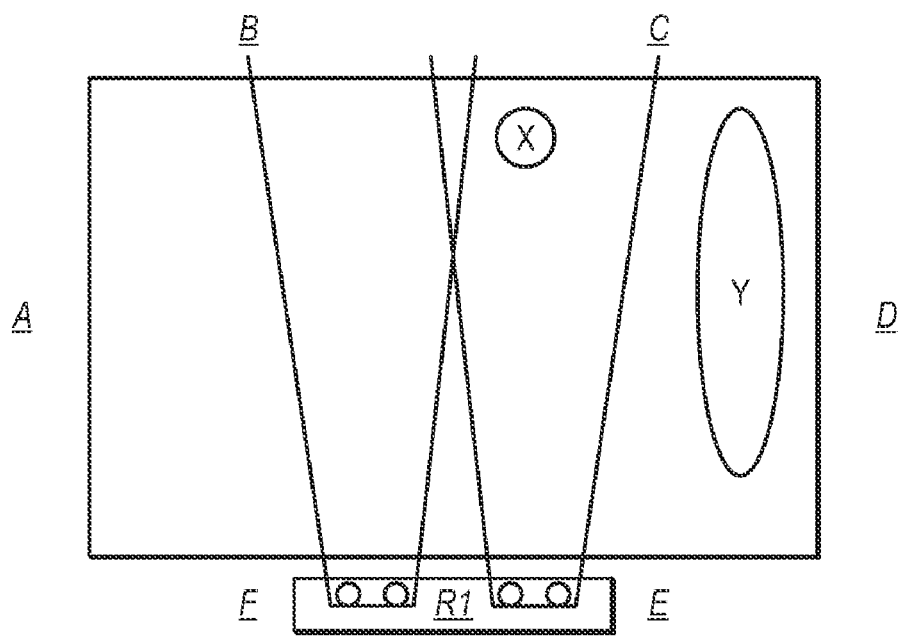
FIG. 4 is an illustration of the revised third position for the detector array compared with the intended third position.

Once the panel 6 is in the second position B a second data set is collected. Again this can be stored for future use, but the processing unit preferably considers the first data set and second data set together and again suggests a solution for the location or locations of sources within the environment. The suggestion this time may be more informative due to the larger data set processed. For instance, the second data set may indicate that none of the detectors 11 gave a count when at position B approaching those observed at the first position A. Simplistically presented, the suggestion may be that the sources are present according to one of two general possibilities. The possibilities are indicated in FIG. 3 and may be:

a) general location X with a source of moderate activity—based on the count rates seen at position A—but to one side and so out of the field of view of the detectors 11 when in position B—based on the count rates seen at positions B; or b) general location Y with a higher activity—based on the count rates seen at position A, but with the activity higher to reflect the greater distance between position A and the source location—potentially any where across the end of the environment—on the basis that all of that part of the environment is out of the field of view from position B.

In the normal sequence of positions intended before measurement started, the next position for the panel 6 would be position C. However, from position C both possibilities a) and b) above would not be considered with the best power to discriminate. Instead, the user or indeed the instrument itself suggests a revised position, position R1 for the next measurement and hence data set. R1 is better than C at resolving between the potential solutions arising from the first data set and second data set. This is because from position C both of the suggestions a) and b) are equally visible, whereas from revised position R1 only suggestion a) is visible. Thus significant counts at R1 would increase the strength of a) as a suggestion, whereas lower counts at R1 would decrease the strength of a) as a suggestion. As a result the suggestions at the end of three measurements are better than they would have been had the pre-commencement set of measurement positions been continued with.

Thus whilst the data sets are gathered sequentially, the data sets can be used as the process goes along to inform decisions for later in the process. Whilst the data sets from all the intended positions can be collected and used together to provide the information on the source locations within the environment, there is the potential to reach a better solution and/or a solution with fewer measurements than under the existing simultaneous data set collection approach. For instance, if the sources are indicated early on as all being at one end of the environment, this may lead to the majority of the positions for later measurements being targeted at that part of the environment rather than at the environment in general. Thus positions A, B, C, D, E, F, may be replaced by A, B, R1, R2, R3, R4, where the revised positions R1, R2, R3, R4, are all positions close to the end of the environment, with more minor changes in position between each of these than between any two positions in the intended position set, A, B, C, D, E, F. This makes the measurements as meaningful as possible and prevents wasteful consideration of parts of the environment which are devoid of sources.

The consideration of the data sets collected may occur as the latest data set is arising and may not need all of that data set to have been collected to start using it. It is also possible to at least partially consider the first data set once, or even whilst, it is being collected. This early consideration of the first data set can provide information on the source locations and/or issues with the data gathering process very early on. This can assist in various ways with the subsequent measurements. For instance, the first data set may indicate a lack of sensitivity of the instrument to a part of the environment, thus necessitating more positions directed at that part of the environment. The first data set and each subsequent data set could potentially be used to modify the subsequent positions and/or steps taken. In some cases, consideration of the data set as it arises may result in the collection of that data set being interrupted part way through on the basis that it is not sufficiently informative to justify further time spent on it. In effect, the first data set forms an image of the source locations. When the first data set is combined with the second data set an improved image arises. When the first, second and third data sets are combined a further improved image arises and so on, to the necessary level of refinement.

Generally speaking, to provide information, such as an image, the data set must provide sufficient knowns to solve the unknowns in the system. Existing approaches have used the full data set from a series of positions to do this. To provide information, such as an image, with less data sets and/or incomplete data sets, the present approach can make use of assumptions and/or constraints to render the processing solvable at each stage Thus variables in the system may be given a value or range of values and/or assumptions about the positions and/or activity of sources may be made in respect of the early data sets to render a solution and hence information possible. As the extent of a data set and/or the number of data sets increases, some of the assumptions and/or constraints may be dropped and/or relaxed.

The process may result in fewer measurements being needed to give the required degree of certainty to the measurement process than is necessary with the use of the pre-commencement set of positions.

The process thus operates by collecting, considering, informing and applying revised collecting. With a number of such cycles optimizing the data collected and the manner in which it is collected.

As well as offering advantages in terms of the resolution of the investigations, this approach offers other significant advantages over the existing approach. In particular it renders the instrument far more portable and easier to transport as it is substantially reduced in size and weight. It also means that the detector panel could be made smaller, to ease access to difficult or small spaces, but the necessary information can still be collected by repeated use of the panel at different positions. It is possible to obtain the desired information about the environment without the need to surround the environment with detectors through the use of a series of positions. The use of an approach to the imaging which uses a linear minimization process and expresses the result as a continuous voxelated image assists in this and other respects.

The approach described above can also be used to modify the use of other instruments, both existing and new. For instance, the approach can be applied where gamma emissions from an environment are being performed with a view to providing tomographical information. In the context of instruments, such as applicant's Radscan 800 instrument, which are used to investigate the location and nature of radioactive material within an environment again the approach operates by collecting, considering, informing and applying revised collecting.

Such instruments find particular use in survey work as part of decommissioning activities. Generally, the shape of the environment, such as a room, is known, together with some knowledge of the items and equipment within the room. On this basis a pre-determined measurement position or set of positions are decided upon. The instrument is then placed at the first position and the data set collected. The next pre-determined position is then used and so on.

In the revised approach, the first pre-determined position is used, but as a result of data set collected there (or even only a part of it) a revised second position, compared with the second pre-determined position may be used. This may because from the first measurement position the data set suggests a source of activity in a particular direction, but the information on the room indicates that both wall and a pipe in front of it are present along that direction. Thus the first data set does not indicate which of these are the actual source location. The second pre-determined measurement position may not assist in this respect because one or both locations are not visible from it or again they overlap to a large extent from that viewing direction. However, the revised position can be selected so as to view the pipe and wall at an angle an so differentiate between them in terms of their direction. The data set from the revised second position thus informs on whether the source is associated with the pipe or the wall.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method of collecting data on radioactive material within an environment, the method comprising;
    providing an instrument;
    providing a set of one or more pre-suggested positions before a detector unit is provided at a first position;
    positioning the detector unit at the first position relative to the environment;
    collecting at least a part of a first set of data on the environment from the first position using the detector unit, the first set of data including a count from the radioactive material and/or a count rate for the radioactive material; and
    collecting at least a part of one or more subsequent sets of data on the environment from one or more subsequent positions using the detector unit, the at least a part of one or more subsequent sets of data including a count from the radioactive material and/or a count rate for the radioactive material, wherein one or more of the subsequent positions is different from the first position so as to provide one or more different subsequent positions;
    wherein one or more of the different subsequent positions is not in the set of one or more pre-suggested positions and the one or more of the different subsequent positions for the detector unit is determined by the instrument by, at least in part, considering the count from the radioactive material in the data of one or more of the sets of data previously collected and/or by considering the count rate for the radioactive material in the data of one or more of the sets of data previously collected.

2. The method according to claim 1 in which the collecting of the set of data involves establishing a count and/or count rate.

3. The method according to claim 1 in which the collecting of the set of data involves establishing a multiplicity rate.

4. The method according to claim 1 in which a single detector unit is used, the detector unit providing a plurality of detectors.

5. The method according to claim 4 in which the detectors are for detecting neutrons.

6. The method according to claim 1 in which the collecting of the set of data provides separate data for each detector in a detector unit.

7. The method according to claim 1 in which the collecting of the set of data provides separate data for the detector unit as a whole.

8. The method according to claim 1 in which a set of data is intended to be collected for a given amount of time and the collection of a set of data is stopped part way through the collection, if the part of a set of data does not meet one or more criteria.

9. The method according to claim 8 in which the criteria is one or more of a minimum level of counts; a minimum level of count rate; the data providing the ability to inform based on the part of a set of data; the ability to discriminate based on the part of a set of data; the ability to resolve based on the part of a set of data.

10. The method according to claim 1 in which the information on the first position and the information on the one or more subsequent positions is captured or known, the information on the positions being defined relative to a known reference point.

11. The method according to claim 1 in which the consideration to determine one or more of the subsequent positions uses one or more sets of data and/or one or more part sets of data.

12. The method according to claim 1 in which the consideration occurs whilst a set of data is being collected.

13. The method according to claim 1 in which the instrument indicates to the user the one or more subsequent positions.

14. The method according to claim 1 in which the pre-suggested position or positions are a standard set of positions for a given environment type and/or size.

15. The method according to claim 1 in which the pre-suggested position or positions are one or more of regular positions within the environment; stepped positions within the environment; sequential positions within the environment; regular positions with respect to a container containing the radioactive material; stepped positions with respect to a container containing the radioactive material; sequential positions with respect to a container containing the radioactive material.

16. The method according to claim 1 in which the pre-suggested set of positions progress in sequence around the environment of a part thereof 17. The method according to claim 1 in which the pre-suggested set of positions are those positions most easily accessible.

18. The method according to claim 1 in which the one or more subsequent positions whose positions are determined by the consideration of the previously collected sets of data differs from a pre-suggested position in terms of the position compared with any of the pre-suggested positions.

19. The method according to claim 1 in which the one or more subsequent positions has a pre-suggested position and a sequence of the position and the one or more subsequent positions whose positions are determined by the consideration of the previously collected sets of data differs from the pre-suggested position in terms of the sequence of the position compared with the pre-suggested position.

20. The method according to claim 1 in which the method includes the use of the data collected to provide information on the radioactive material.

21. The method according to claim 20 in which the method includes the use of the data collected to provide information on one or more of the position of the radioactive material; the activity of the radioactive material; the mass of the radioactive material; the isotopic make up of the radioactive material.

22. The method according to claim 20 in which the method provides information by rendering the information in a solvable form, given the set or sets of data or parts thereof collected, by the use of one or more factors.

23. The method according to claim 22 in which one or more of the factors change or are no longer needed for the provision of information as the number sets of data increases.

24. The method according to claim 22 in which one or more of the factors change or are no longer needed for the provision of information as the completeness of one or more of the sets of data increases.

25. The method according to claim 22 in which one or more of the factors are relaxed as the number of the sets of data increases.

26. The method according to claim 22 in which one or more of the factors are relaxed as the completeness of one or more of the sets of data increases.

27. The method according to claim 1 in which one or more of the one or more subsequent positions determined is determined so as to improve the information on the radioactive material provided as a result of the data collected from that position.

28. The method according to claim 1 in which one or more of the one or more subsequent positions determined is determined so as to increase the accuracy and/or confidence of the information on the radioactive material.

29. The method according to claim 1 in which one or more of the one or more subsequent positions determined is determined so as to decrease the error and/or uncertainty in the information on the radioactive material.

30. The method according to claim 1 in which one or more of the one or more subsequent positions determined is determined so as to address issues with one or more parts of the environment.

31. The method according to claim 30 in which the issues are one or more of: shielding; attenuation; matrix effects; uneven distribution of radioactive material; detector sensitivity; or detector unit sensitivity.

32. A method of collecting data on radioactive material within an environment, the method comprising:

providing an instrument;

providing a set of one or more pre-suggested positions before a detector unit is provided at a first position;

positioning the detector unit at the first position relative to the environment, the detector unit including a detector;

collecting at least a part of a first set of data on the environment from the first position using the detector unit, the first set of data including a count from the radioactive material and/or a count rate for the radioactive material; and collecting at least a part of one or more subsequent sets of data on the environment from one or more subsequent positions using the detector unit, the at least a part of one or more subsequent sets of data including a count from the radioactive material and/or a count rate for the radioactive material, wherein one or more of the subsequent positions being different from the first position so as to provide one or more different subsequent positions;

wherein one or more of the different subsequent positions is not in the set of one or more pre-suggested positions and the one or more of the different subsequent positions for the detector unit is determined by the instrument by, at least in part, considering the count from the radioactive material in the data of one or more of the sets of data previously collected and/or by considering the count rate for the radioactive material in the data of one or more of the sets of data previously collected; and wherein one or more of the subsequent positions for the detector unit are determined to address through increased data sets issues with one or more parts of the environment, the issues being selected from the group consisting of shielding of the radioactive material within the environment, attenuation of emissions from the radioactive material, effects of a matrix in which the radioactive material is present, uneven distribution of radioactive material within the environment, sensitivity of the detector and sensitivity of the detector unit.

* * * * *

UNITED STATES PATENT AND TRADEMARK OFFICE
CERTIFICATE OF CORRECTION

PATENT NO. : 7,564,041 B2  
APPLICATION NO. : 11/396090  
DATED : July 21, 2009  
INVENTOR(S) : Ronaldson et al.

Page 1 of 1

It is certified that error appears in the above-identified patent and that said Letters Patent is hereby corrected as shown below:

Title Page  
Item 73, Assignee, change "Bil Solutions Limited, Seascale, Cumbria (GB)" to --VT Nuclear Services Limited, Southampton, Hampshire (GB)--

Signed and Sealed this  
Twenty-sixth Day of July, 2011

David J. Kappos  
*Director of the United States Patent and Trademark Office*